2 Sheets—Sheet 1.

E. M. LANG.
SOLDER WIRE MACHINES.

No. 179,119. Patented June 27, 1876.

Witnesses:
Frank H. Jordan
Scott D. Jordan

Inventor:
Edward M. Lang
per Wm. Henry Clifford
atty.

2 Sheets—Sheet 2.

E. M. LANG.
SOLDER WIRE MACHINES.

No. 179,119. Patented June 27, 1876.

Witnesses:
Frank H. Jordan,
Scott D. Jordan.

Inventor:—
Edward M. Lang
per
Wm. Henry Clifford
atty.

UNITED STATES PATENT OFFICE.

EDWARD M. LANG, OF PORTLAND, MAINE.

IMPROVEMENT IN SOLDER-WIRE MACHINES.

Specification forming part of Letters Patent No. 179,119, dated June 27, 1876; application filed November 6, 1874.

*To all whom it may concern:*

Be it known that I, EDWARD M. LANG, of Portland, in the county of Cumberland and State of Maine, have invented certain new and useful Improvements in Methods and Machinery for Cutting and Bending Solder-Wire; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
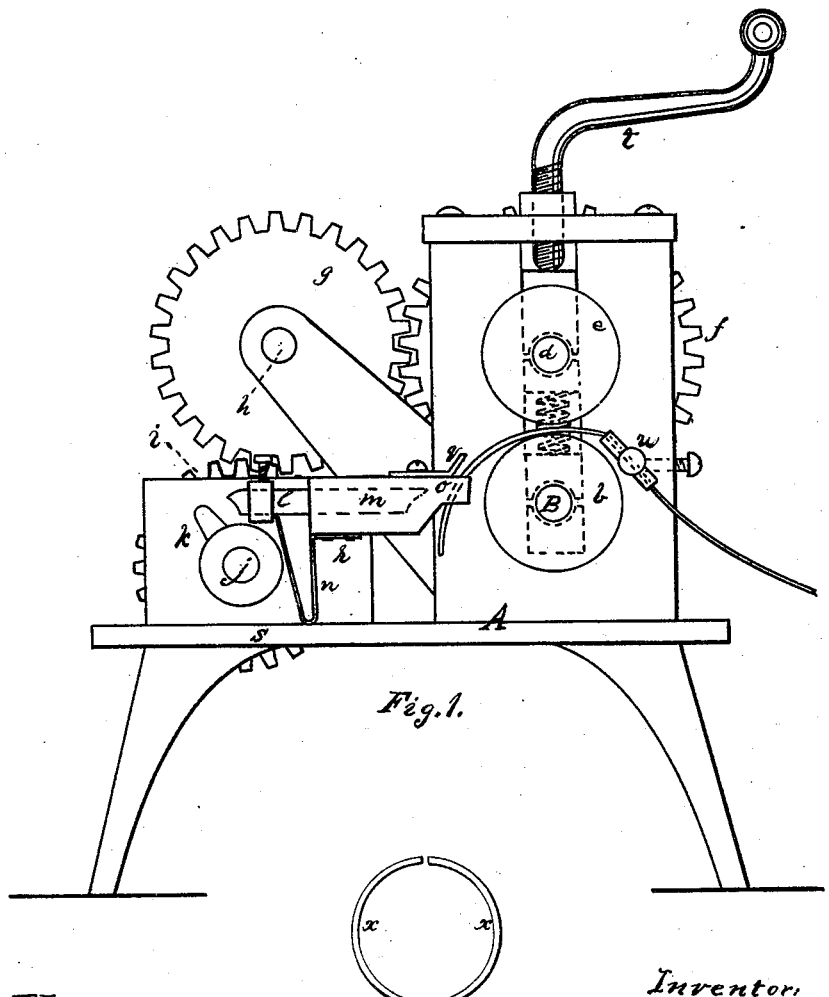
Figure 3:
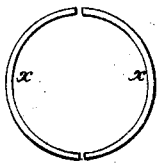
Figure 2:
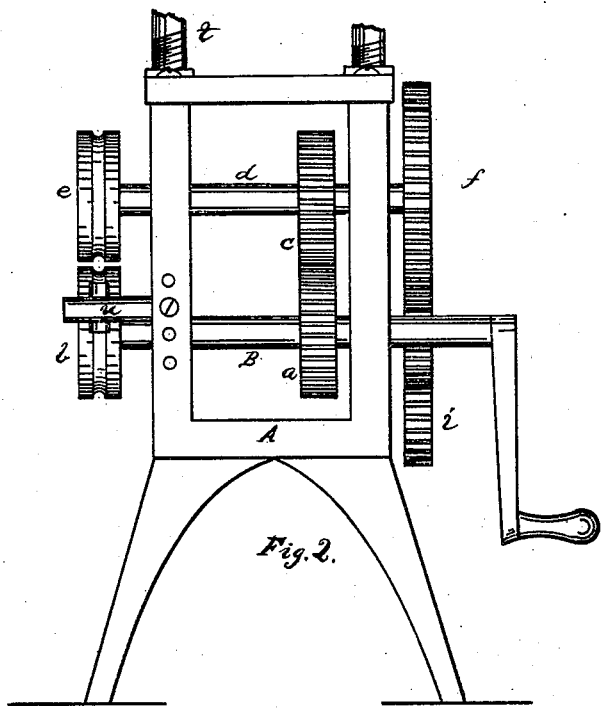
Figure 4:
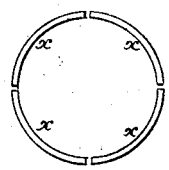

Figure 1 is a side elevation; Fig. 2, an end view. Figs. 3 and 4 show the wire segments arranged to form rings.

The object of the present invention is to devise a method of curving or bending and cutting solder-wire to be used in the soldering of cans, vessels, or packages; and the novelty consists, first, in the machine by which this process can be easily and quickly carried out; second, in the solder-wire as prepared by these means, and made ready in segments of a circle for sale to the trade and for use—all as will now be more specifically and in detail set out and explained.

The operating parts of the machine are placed in a convenient frame, A. B represents the motor-shaft. To this shaft are rigidly connected the gear $a$ and the guiding-wheel $b$. From the gear $a$ motion is communicated to the gear $c$, rigidly set on the shaft $d$, which carries the guiding-wheel $e$, which is placed directly over the wheel $b$. On the opposite end of the shaft $d$ is rigidly set the gear $f$, matching with the gear $g$, set on a short shaft, $h$. This gear matches with the pinion $i$ on the shaft $j$, which carries at its opposite end the cam $k$. $l$ is a horizontal rod, working in a guide-box, $m$, and a little elevated above the cam $k$. This rod is kept pressed outward toward the cam $k$ by the spring $n$, or any equivalent device, and it is so placed that when its end is struck by the cam $k$, or any projection thereon, it will be forced forward into the guide-box $m$, and, when the cam has passed the end of the rod $l$, the spring $n$ will restore the rod to its former position. The end of the rod $l$, which is next to the guiding-wheel $b$, is shaped to an edge to form a cutter, and works up in contact with the under side of a plate, $o$, which has a perforation. Over the perforation is the guide $q$. $r$ is the frame which supports the guide-box $m$, shaft $j$, cam $k$, and pinion $i$, and is adjustable on the bed $s$, backwardly and forwardly. The guiding-wheel $e$ is adjustable in its relation to and distance from the guiding-wheel $b$ by being set in the sliding box, operated by a screw-shaft and crank, $t$, which moves the sliding box as desired in the vertical part of the frame A. $u$ is a guide, through which the wire is to be passed and directed for its passage between the guiding-wheels $e$ and $b$. This is made adjustable by being movable in the vertical frame A.

In the preparation of solder-wire for its application to cylindrical vessels, like tin cans, it is essential to its economy and facility of application that it should possess such a curvature as will enable it to fit the curvature of the vessel to which it is to be applied.

My improved method of preparation of solder-wire for use in soldering vessels, like tin cans, consists in separating by cutting the continuous wire into such lengths as are desired for any especial purpose, and also imparting to such sections $x$ of the wire such curvature as will enable it to fit, so far as the curvature is concerned, the shape of the vessel to which it is applied. When so cut and bent, the solder-wire in different segments $x$ of a circle is ready for application to that size of vessels for which it was bent and cut.

This method can be effected in a variety of combinations of devices; but the operation of the machine hereinbefore described is as follows: The wire is inserted through the guide $u$, from whence it passes between the two guiding and feeding wheels $b$ and $e$, after passing which, entering a perforation in the plate $o$, it is submitted to the cutter on the end of the horizontal rod $e$. At every traverse of this rod a section of the wire is cut off. Curvature is imparted to the sections of the wire by the passage of the wire over the lower guiding and feeding wheel $b$, and the entrance into the perforation in the plate $o$. The feeding and guiding wheels are, or may be, channeled or grooved to receive the wire, and provided with teeth or corrugations to facilitate the feeding. The size of the segments $x$ of the wire may be regulated by the distance from the feeding-wheels of the adjustable frame $r$, moving on the bed $s$. The length of these segments $x$ may also be regulated by the number of projections, and their distance from each other, of the cam or cams $k$.

I thus produce a new article of trade, and one possessing peculiar advantages in use. The curved segments $x$ are usually adapted by using two or more to form a nearly complete ring or annulus of suitable size to fit the ordinary-sized opening in the can; but they need not be made strictly of the size, because, when smaller, the several parts readily flow together under the heat of the hot iron, and yield sufficient material to close the joint, while with rings of given sizes this adaptation to different-sized openings cannot be made; and with open rings there is the delay of shaping and setting them when they are not exactly of the diameter of the can-opening.

What I claim as my invention, and desire to secure by Letters Patent, is—

1. In the within-described machine for bending and cutting solder-wire, the combination of feed and guide wheels $b$ and $c$ with the automatic cutter-rod $l$, guide $q$, and adjustable guide $u$, substantially as and for the purposes set forth.

2. As a new article of manufacture, the curved segments, of solder-wire, two or more of which are adapted to form a nearly complete ring, substantially as and for the purposes set forth.

In testimony that I claim the foregoing as my own I affix my signature in presence of two witnesses.

E. M. LANG.

Witnesses:
GEO. A. MARSH,
FRANK H. JORDAN.